(12) United States Patent
Yoshimura et al.

(10) Patent No.: US 12,424,391 B2
(45) Date of Patent: Sep. 23, 2025

(54) ELECTRODE FOIL FOR ELECTROLYTIC CAPACITORS, ELECTROLYTIC CAPACITOR, METHOD FOR PRODUCING ELECTRODE FOIL FOR ELECTROLYTIC CAPACITORS, AND METHOD FOR PRODUCING ELECTROLYTIC CAPACITOR

(71) Applicant: Panasonic Intellectual Property Management Co., Ltd., Osaka (JP)

(72) Inventors: Mitsuhisa Yoshimura, Osaka Fu (JP); Masami Tsubaki, Kyoto Fu (JP); Naomi Kurihara, Osaka Fu (JP); Miwa Ogawa, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 18/042,435

(22) PCT Filed: Aug. 18, 2021

(86) PCT No.: PCT/JP2021/030242
§ 371 (c)(1),
(2) Date: Feb. 21, 2023

(87) PCT Pub. No.: WO2022/044932
PCT Pub. Date: Mar. 3, 2022

(65) Prior Publication Data
US 2023/0335341 A1   Oct. 19, 2023

(30) Foreign Application Priority Data

Aug. 27, 2020 (JP) .................................. 2020-143913

(51) Int. Cl.
*H01G 9/055* (2006.01)
*H01G 9/00* (2006.01)
(Continued)

(52) U.S. Cl.
CPC ........... *H01G 9/055* (2013.01); *H01G 9/0029* (2013.01); *H01G 9/045* (2013.01); *H01G 9/145* (2013.01); *H01G 9/15* (2013.01)

(58) Field of Classification Search
CPC ...... H01G 9/055; H01G 9/0029; H01G 9/045; H01G 9/145; H01G 9/15
See application file for complete search history.

(56) References Cited

U.S. PATENT DOCUMENTS

| 2002/0152842 A1 | 10/2002 | Oda et al. |
| 2003/0111247 A1* | 6/2003 | Araki .................... H01G 11/56 174/520 |

(Continued)

FOREIGN PATENT DOCUMENTS

| JP | S49-033154 A | 3/1974 |
| JP | H04-280413 A | 10/1992 |

(Continued)

OTHER PUBLICATIONS

International Search Report dated Nov. 16, 2021 issued in International Patent Application No. PCT/JP2021/030242, with English translation.

*Primary Examiner* — Michael P McFadden
(74) *Attorney, Agent, or Firm* — Rimon P.C.

(57) ABSTRACT

An electrode foil for an electrolytic capacitor includes an anode body having a porous portion and a core part continuous with the porous portion, a dielectric layer covering a surface of a metal skeleton forming the porous portion, wherein an interface layer including a first element is present between the metal skeleton and the dielectric layer, and the first element is at least one selected from the group consisting of sulfur, nitrogen, and phosphorus.

15 Claims, 10 Drawing Sheets

(51) Int. Cl.
*H01G 9/045* (2006.01)
*H01G 9/145* (2006.01)
*H01G 9/15* (2006.01)

(56) References Cited

U.S. PATENT DOCUMENTS

| | | | |
|---|---|---|---|
| 2003/0112577 A1 | 6/2003 | Kabe et al. | |
| 2004/0190226 A1* | 9/2004 | Yano | H01G 9/0032 361/528 |
| 2006/0047030 A1* | 3/2006 | Yoshida | C08K 5/3445 524/99 |
| 2007/0030622 A1* | 2/2007 | Saida | H01G 9/15 361/272 |
| 2008/0005878 A1* | 1/2008 | Merker | H01G 9/0036 29/25.03 |
| 2008/0047116 A1* | 2/2008 | Takatani | H01G 9/0032 29/25.03 |
| 2010/0053848 A1* | 3/2010 | Kikuchi | H01G 9/028 361/523 |
| 2010/0175235 A1* | 7/2010 | Nielsen | H01G 9/08 29/25.03 |
| 2011/0205691 A1* | 8/2011 | Fujita | H01G 9/15 29/25.03 |
| 2012/0218681 A1* | 8/2012 | Kosuge | H01G 9/0036 361/523 |
| 2015/0077901 A1* | 3/2015 | Petrzilek | H01G 9/052 361/504 |
| 2017/0271086 A1* | 9/2017 | Kuzeci | H01G 9/07 |
| 2018/0158611 A1 | 6/2018 | Arakawa et al. | |
| 2018/0358181 A1 | 12/2018 | Ogawa et al. | |

FOREIGN PATENT DOCUMENTS

| | | |
|---|---|---|
| JP | H06-097007 A | 4/1994 |
| JP | H10-308329 A | 11/1998 |
| JP | 2001-223141 A | 8/2001 |
| WO | 03/032344 A1 | 4/2003 |
| WO | 2017/026247 | 2/2017 |
| WO | 2017/154461 | 9/2017 |

* cited by examiner

ELECTRODE FOIL FOR ELECTROLYTIC CAPACITORS, ELECTROLYTIC CAPACITOR, METHOD FOR PRODUCING ELECTRODE FOIL FOR ELECTROLYTIC CAPACITORS, AND METHOD FOR PRODUCING ELECTROLYTIC CAPACITOR

CROSS-REFERENCE OF RELATED APPLICATIONS

This application is the U.S. National Phase under 35 U.S.C. § 371 of International Patent Application No. PCT/JP2021/030242, filed on Aug. 18, 2021, which in turn claims the benefit of Japanese Patent Application No. 2020-143913, filed on Aug. 27, 2020, the entire disclosures of which Applications are incorporated by reference herein.

TECHNICAL FIELD

The present invention relates to an electrode foil for an electrolytic capacitor, an electrolytic capacitor, a method for producing an electrode foil for an electrolytic capacitor, and a method for producing an electrolytic capacitor.

BACKGROUND ART

Electrode foils of an electrolytic capacitor include an anode body having a porous portion on its surface. For the anode body, for example, a metal foil containing a valve metal is used, and the metal foil is subjected to etching to form a porous portion to increase the capacity of the electrolytic capacitor. The electrode foil also includes a dielectric layer covering the porous portion. For example, Patent Literature 1 has proposed forming the dielectric layer by a gas phase method.

CITATION LIST

Patent Literature

Patent Literature 1: WO 2017/26247

SUMMARY OF INVENTION

Problem to be Solved by the Invention

In an electrolytic capacitor in which the dielectric layer surface is covered with a conductive polymer compound, a damage caused to the dielectric layer easily increases a leak current.

Means for Solving the Problem

An aspect of the present invention relates to an electrode foil for an electrolytic capacitor including an anode body having a porous portion and a core part continuous with the porous portion, a dielectric layer covering a surface of a metal skeleton forming the porous portion, wherein an interface layer including a first element is present between the metal skeleton and the dielectric layer, and the first element is at least one selected from the group consisting of sulfur, nitrogen, and phosphorus.

Another aspect of the present invention relates to an electrolytic capacitor including a capacitor element, wherein the capacitor element includes the above-described electrode foil for an electrolytic capacitor, and a conductive polymer compound covering at least a portion of the dielectric layer.

Still another aspect of the present invention relates to a method for producing an electrode foil for an electrolytic capacitor, the method including a first step of preparing an anode body having a porous portion and a core part continuous with the porous portion, a second step of forming an interface layer covering a surface of a metal skeleton forming the porous portion and including a first element, and a third step of forming a dielectric layer continuous with the interface layer, wherein the first element is at least one selected from the group consisting of sulfur, nitrogen, and phosphorus.

Still another aspect of the present invention relates to a method for producing an electrolytic capacitor, including the step of the method for producing an electrode foil for an electrolytic capacitor of the present invention described above, and a fourth step of covering at least a portion of the dielectric layer with a conductive polymer compound.

Effects of the Invention

The present invention can suppress an increase in a leak current in electrolytic capacitors. While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
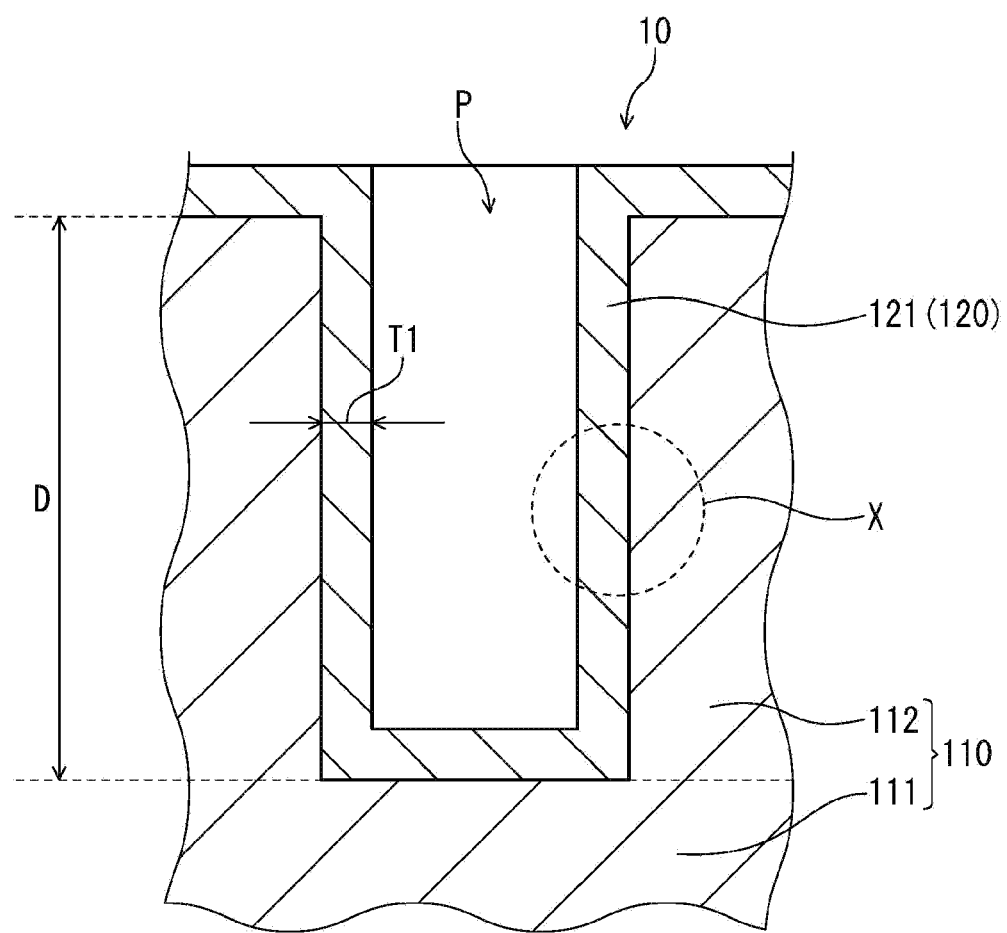
FIG. 1 A schematic cross sectional view illustrating an important portion of an electrode foil in an embodiment of the present invention.

An electrode foil for an electrolytic capacitor in an embodiment of the present invention includes an anode body having a porous portion and a core part continuous with the porous portion, and a dielectric layer covering a surface of a metal skeleton forming the porous portion. In the following, the anode body having a porous portion is also referred to as a metal foil having a porous portion.

An interface layer including a first element is present between the metal skeleton forming the porous portion and the dielectric layer. The first element is at least one selected from the group consisting of sulfur, nitrogen, and phosphorus.

By providing the above-described interface layer, a leak current can be sufficiently reduced, and reliability of the electrolytic capacitor can be increased. This is probably because when restoring the dielectric layer damages, the interface layer including a first element forms an excellent film containing a large amount of amorphous component and with which a leak current is not caused easily.

In a middle to high voltage type electrolytic capacitor, the dielectric layer damage easily causes an increase in a leak current particularly, and therefore the effect of reducing the leak current by providing the above-described interface layer can be obtained significantly. The electrode foil used for the middle to high voltage type electrolytic capacitor has a withstand voltage of, for example, 30 V or more, preferably 120 V or more, more preferably 160 V or more, and even more preferably 200 V or more.

It is advantageous in that sulfur and phosphorus as the above-described first element easily forms an amorphous form. It is advantageous in that nitrogen as the above-described first element suppresses crystallization.

The interface layer may have a small thickness, and it may not be clearly a layer structure. It can be a region where spots of the first element are present between the dielectric layer and the metal skeleton. In other words, the interface layer can be regarded as formed when the first element is detected in a minute region between the dielectric layer and the metal skeleton in analysis with EDX, GD-OES, or FE-AES described later. The interface layer has a thickness of, for example, 10 nm or less and 0.1 nm or more, or 5 nm or less. The interface layer thickness is an average value of the thickness of the interface layer at any 10 points in cross sectional images of the porous portion of the electrode foil in the thickness direction obtained with a scanning electron microscope (SEM).

In view of sufficiently reducing the leak current easily, the interface layer contains the first element by preferably 0.01 mass % or more, more preferably 0.1 mass % or more, and more preferably 0.5 mass % or more relative to all the elements. In view of ensuring the dielectric layer and the interface layer with suitable thicknesses, the above-described first element may be contained by 0.01 mass % or more and 10 mass % or less, or 0.50 mass % or more and 5 mass % or less.

For the analysis on the elements distribution and concentration in the interface layer and the dielectric layer, for example, energy dispersive X-ray spectroscopy (EDX), Glow Discharge Optical Emission Spectrometry (GD-OES), and Field Emission Auger Electron Spectroscopy (FE-AES) can be used. For example, when the interface layer is analyzed with GD-OES from the surface of the first layer side of the interface layer in its depth direction, if a peak attributed to the first element is observed, it can be determined that the interface layer contains the first element corresponding to the peak.

The anode body includes a first metal, and the dielectric layer has a first layer including an oxide of a second metal. The second metal may be the same as the first metal, or may be different from the first metal. An interface layer continuous with the first layer is present between the metal skeleton forming the porous portion and the first layer. The interface layer may be present at an interface between the first layer and the metal skeleton, and the interface layer may be present at an interface between the first layer and another layer covering the metal skeleton (e.g., a portion of the second layer described later).

The interface layer includes at least a first element, and may further include a first metal and/or a second metal as an oxide. The interface layer may be formed, for example, with a compound including the first element and having insulating properties (oxide, etc.), or may be formed by a functional group bonded to the metal skeleton at the surface of the metal skeleton including the first element.

When the second metal is different from the first metal, the second metal with a high relative dielectric constant can be selected without restrictions from the first metal, and the electrolytic capacitor capacity can be easily improved. Furthermore, since the second metal can be selected from a wide range of choices, various functions can be easily imparted to the dielectric layer, without restricted by the first metal. The first metal may include, for example, Al. The second metal may include at least one selected from the group consisting of Ta, Nb, Ti, Si, Zr, and Hf.

When the first layer contains two or more oxides of the second metal, the two or more oxides may be present in a mixed state, or each of them may be disposed by layers. The first layer may include a composite oxide with two or more metals. In view of increasing the capacity of the electrolytic capacitor, the oxide of the second metal preferably has a dielectric constant higher than that of the oxide of the first metal. Preferably, in view of increasing the withstand voltage of the electrolytic capacitor, the second metal is Ta, Ti, or Si.

Figure 2:
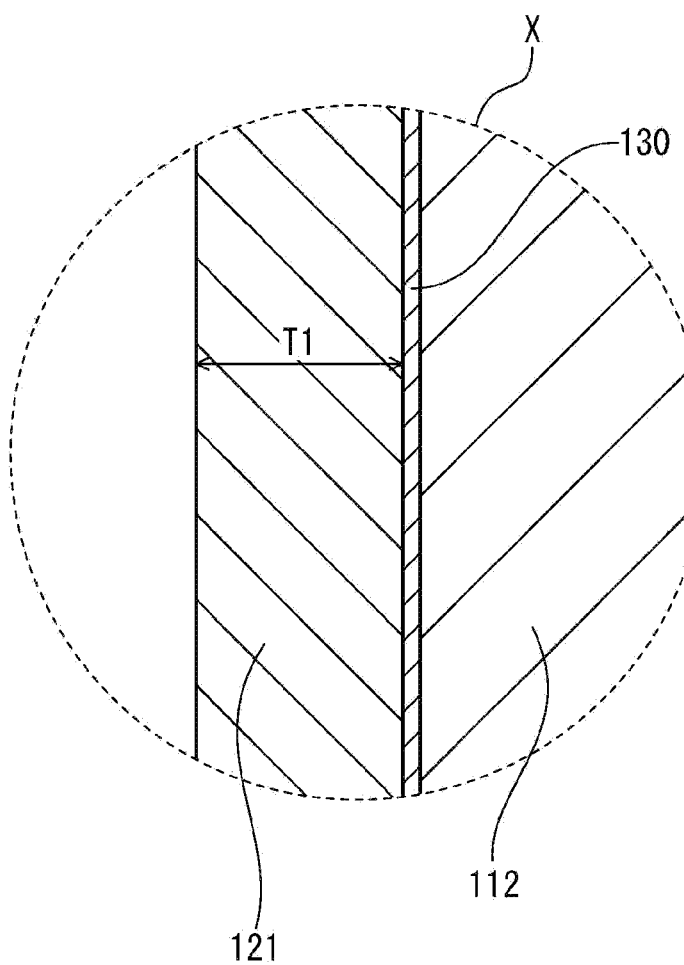
FIG. 2 An enlarged view of a portion surrounded by the broken line X in FIG. 1.

FIG. 1 is a schematic cross sectional view illustrating an example of an electrode foil. FIG. 1 shows a portion of a porous portion having a dielectric layer. FIG. 2 is an enlarged view of a portion surrounded by the broken line X in FIG. 1.

As shown in FIG. 1, an anode foil 10 includes an anode body 110 of an integration of a core material portion 111 and a porous portion 112, and a dielectric layer 120 (first layer 121) covering the surface of a metal skeleton forming the porous portion 112. The porous portion 112 has a plurality of tunneled pits P surrounded by the metal skeleton. The dielectric layer 120 is provided so as to cover at least a portion of the surface of the metal skeleton. The first layer 121 has an oxide of a second metal, and has a thickness T1. An interface layer 130 is provided at an interface between the first layer 121 and the metal skeleton. In FIG. 1, D shows the porous portion thickness. In the case of the middle to high voltage type electrolytic capacitor, the first layer 121 has a thickness T1 of, for example, 40 nm or more and 200 nm or less.

(Second Layer)

The electrode foil may have a second layer including the first metal between the metal skeleton and the first layer. At this time, the dielectric layer has the first layer and the second layer. The second layer is formed by chemically treating the anode body, and along with the treatment, the damages to the first layer may be restored. The second layer includes an oxide of the first metal, may include an oxide of the second metal, or a composite oxide of the first metal and the second metal.

The second layer formed by chemically treating the anode body having the first layer and the interface layer at the surface thereof has a region (interface layer) including a first element at at least a first layer side. When the second layer has a small thickness, the entirety of the second layer may be the region including the first element (interface layer). Along with the chemical treatment (second layer formation), in the region including the first element, an excellent film with a low crystallinity and less damage can be easily formed. Thus, the leak current is reduced even more. Preferably, when the second layer is formed by chemical treatment, for the first metal, a valve metal suitable for the chemical treatment is used.

The thickness T2 of the second layer is not particularly limited, but may be smaller than the thickness T1 of the first layer. By forming the first layer with a relatively large thickness, when, for example, selecting a second metal having a high dielectric constant, the capacity of the electrolytic capacitor can be significantly improved. The thickness T2 of the second layer is, for example, 0.5 nm or more and 200 nm or less, and may be 5 nm or more and 100 nm or less.

The ratio of the thickness T1 of the first layer to the thickness T2 of the second layer is not particularly limited, and may be set as appropriate depending on the use, the desired effect, and others. For example, the thickness ratio: T1/T2 may be 1 or more, or 2 or more, or 5 or more.

Figure 3:
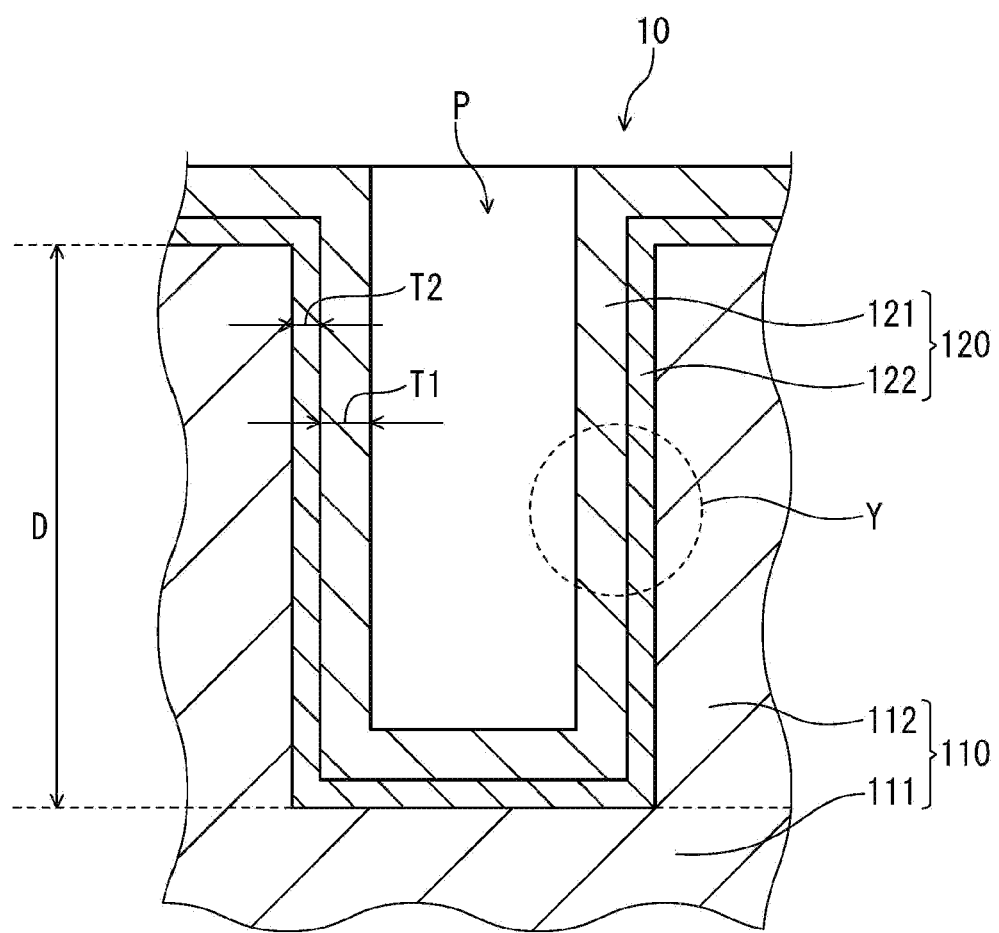
FIG. 3 A schematic cross sectional view illustrating an important portion of an electrode foil in another embodiment of the present invention.
Figure 4:
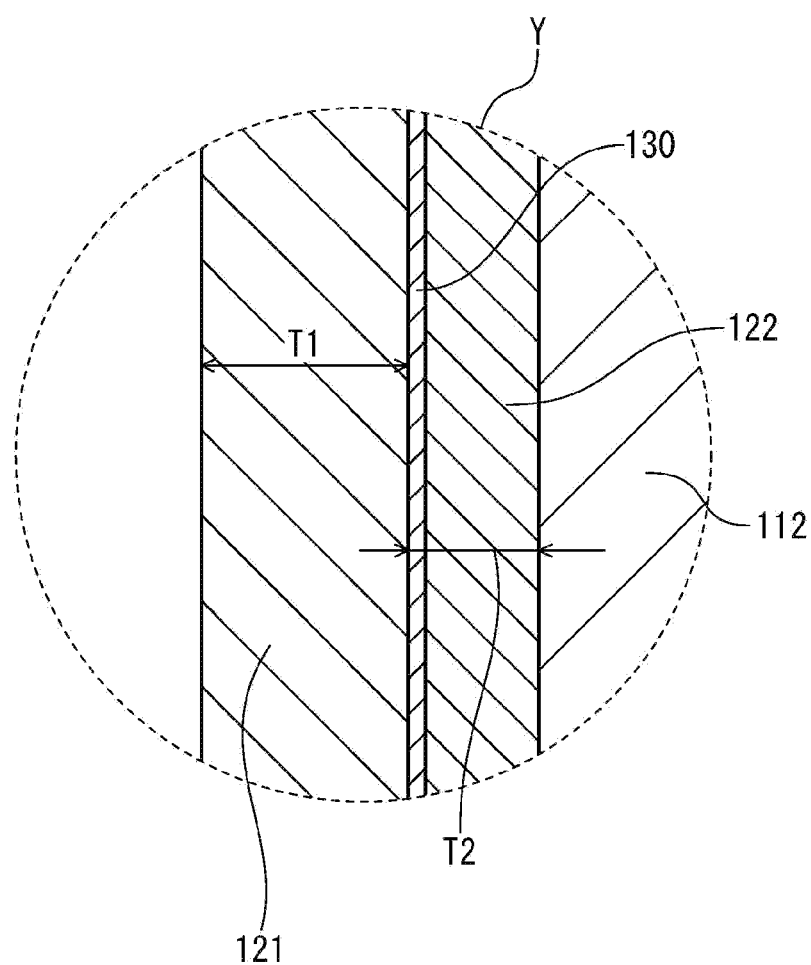
FIG. 4 An enlarged view of a portion surrounded by the broken line Y in FIG. 2.

FIG. 3 is a schematic cross sectional view illustrating another example of the electrode foil. FIG. 3 shows a portion of the porous portion having a dielectric layer on its surface. FIG. 4 is an enlarged view of a portion surrounded by the broken line Y in FIG. 3. In FIG. 3, the same reference numerals are given to the elements corresponding to those in FIG. 1, and for those elements same with those in FIG. 1, explanation is omitted. In FIG. 4, the same reference numerals are given to the elements corresponding to those in FIG. 2, and for those elements same with those in FIG. 2, explanation is omitted.

As shown in FIG. 3, the dielectric layer 120 has, in order from the metal skeleton side of the porous portion, a second layer 122 and a first layer 121. The first layer 121 has a thickness T1, and the second layer has a thickness T2. As shown in FIG. 4, the second layer 122 has a region including a first element (interface layer 130) at the first layer 121. When the second layer has a very small thickness, the entire second layer may be the region including a first element (interface layer).

(Anode Body)

The anode body is, for example, an integration of a core part and a porous portion. The anode body is produced by, for example, subjecting a portion of the metal foil including the first metal by etching. The porous portion is an outside portion of the metal foil made into porous by etching, and the remaining portion of the inside the metal foil is the core part.

The metal framework refers to a metal portion having a fine structure in the porous portion. The porous portion has pits or pores surrounded by the metal framework. The dielectric layer is provided so as to cover at least a part of the surface of the metal framework surrounding the pits or pores.

The thickness of the porous portion is not particularly limited, and may be selected as appropriate depending on the use of the electrolytic capacitor, the required withstand voltage, and the like. The porous portion has a thickness D of, for example, 10 μm or more and 160 μm or less, or 50 μm or more and 160 μm or less. The porous portion thickness D may be, for example, per one side, 1/10 or more, and 5/10 or less of the anode body thickness. The porous portion thickness D can be determined by obtaining an SEM image of the cross sections of the porous portion of the anode body (electrode foil) in the thickness direction, and calculating the average value of the thickness at any 10 points. The dielectric layer thickness, that is, the first layer thickness T1 and the second layer thickness T2 can be determined in the same manner.

The porous portion has a plurality of pits (micropores). The pit has a tunnel shape. Examples of the shape of the tunneled pit include columnar shapes (e.g., cylindrical, prisms such as rectangular prisms), cones (e.g., circular cone, and pyramids such as quadrangular pyramids), and truncated cone shapes (e.g., circular truncated cone shapes, and truncated pyramids such as truncated quadrangular pyramids). The shapes of the plurality of tunneled pits included in the porous portion may be the same or different. The length direction of the tunneled pit is, when the pit is cylindrical, parallel to the cylinder axis, and when it is a circular truncated cone, it is parallel to the straight line going through the center of the circle of the upper face and bottom face of the circular truncated cone. When it is a tunneled pit, an interface layer can be easily formed on the wall surface of the pit. Furthermore, a dielectric layer (first layer) having a large thickness of, for example, 20 nm or more and 300 nm or less can be easily formed from the surface side to the core part side (pit deep portion) of the porous portion. The ALD method allows for formation of a film covering the wall surface of the pit easily. The wall surface of the pit can be easily covered with a conductive polymer compound or a conductive polymer compound and a liquid component to the pit deep portion. This allows for production of an electrode foil with a low resistance, high heat-releasing characteristics, and excellent strength easily. The pit may be in a sponge form.

In view of increasing the surface area and forming the dielectric layer to a porous portion (pit) deep portion, the pit (micropores) may have an average diameter (micropores diameter) of, for example, 50 nm or more and 2100 nm or less. When the pit has an average diameter of 200 nm or more, in the second step (in which the anode body is immersed in a first treatment liquid including a first element) described later, the first treatment liquid including a first element can be easily attached to the wall surface of the pit. Furthermore, in the fourth step (in which the electrode foil is immersed in a second treatment liquid including a conductive polymer compound) described later, the wall surface of the pit can be easily covered with a conductive polymer compound or a conductive polymer compound and a liquid component.

The tunneled pit may have an average diameter of, 170 nm or more and 2100 nm or less, 200 nm or more and 2100 nm or less, or 500 nm or more and 1500 nm or less. When the tunneled pit has an average diameter in the above-described range, a dielectric layer having a relatively large thickness can be formed to the porous portion (pit) deep portion, and an electrode foil suitable for a middle to high voltage type electrolytic capacitor can be easily obtained. The sponge form pit may have an average diameter of, 50 nm or more and 500 nm or less, or 80 nm or more and 300 nm or less.

The pit average diameter is the most frequent pore size in a volumetric pore size distribution as measured with, for example, a mercury porosimeter. In the case of the tunneled pit, the average diameter of the pit can be determined by measuring the pit diameter at any 10 points using an SEM image of cross sections of the porous portion of the electrode foil (anode body) in the thickness direction, and calculating the average value.

The tunneled pit includes at least a main pit extending from the surface side of the porous portion to the core part side. The main pit allows for formation of the dielectric layer to the core part side of the porous portion easily, and it can be easily immersed in the conductive polymer compound and the liquid component. The main pit can extend in the thickness direction (direction perpendicular to the surface of the porous portion) of the porous portion, and may extend and inclined relative to the thickness direction of the porous portion. In a cross section in the thickness direction of the porous portion of the anode body, a length direction of the main pit and a thickness direction of the porous portion may form an angle of (acute angle), 80° or less, 45° or less, 30° or less, or 15° or less.

The main pit diameter may be large or small at the core part side than the surface side of the porous portion. In this manner, in the cross section in the thickness direction of the porous portion of the anode body, the wall surface of the main pit may be inclined relative to the length direction of the main pit. In this case, the conductive polymer compound or the conductive polymer compound and the liquid component can be immersed in the pit easily. In this case, the main pit has a shape of, for example, a cone or truncated cone shape. Preferably, in this case, the main pit (length direction) is inclined by 15° or less relative to the thickness direction of the porous portion. When the length direction of the main pit generally coincides with the thickness direction of the porous portion, the inclination angle of the wall surface of the main pit relative to the length direction of the main pit generally coincides with the inclination angle of the wall surface of the main pit relative to the thickness direction of the porous portion. In the above-described case, the inclination angle of the wall surface of the main pit relative to the length direction of the main pit (acute angle) is preferably 0.01° or more and 3° or less, more preferably 0.1° or more and 2.8° or less, even more preferably 0.1° or more and 2.5° or less, particularly preferably 0.2° or more and 2.2° or less. The inclination angle of the wall surface of the main pit can be adjusted, for example, crystal orientation of the metal foil and etching conditions (e.g., types of etching liquid (acid), electric current density, liquid temperature, etching time).

The angle formed by the wall surface of the main pit and the length direction of the main pit can be determined by measuring the above-described angle of any 10 main pits using an SEM image of cross sections of the porous portion of the electrode foil (anode body) in the thickness direction, and calculating the average value. The angle formed by the length direction of the main pit (direction of extension of main pit) and the thickness direction of the porous portion can also be determined in the same manner.

The anode body has a first main surface and a second main surface opposite to the first main surface, and the porous portion has a first porous portion provided at the first main surface side, and a second porous portion provided at second main surface side, and the main pit may have a first pit in the first porous portion and a second pit in the second porous portion. At least a portion of the first pit may further extend from the first porous portion to the second porous portion. In this case, the dielectric layer can be easily formed to the pit deep portion, the conductive polymer compound and the liquid component can easily go into these, and the surface area of the anode body increases, which is advantageous in terms of improvement in capacitance.

Furthermore, at least a portion of the first pit may further extend from the first porous portion to the second porous portion to be connected with at least a portion of the second pit. Relative to the entire first pit, the ratio of the first pit connected with the second pit (number ratio) is, for example, 5% or more, or it may be 5% or more and 20% or less. When supplying a source gas to the anode body (porous portion) by the ALD method, the source gas entered from one of the first main surface and the second main surface into the pit can move to the pit of the other of the first main surface and the second main surface. Thus, the source gas can be easily diffused to a deep portion of the first pit and the second pit. Unnecessary components in the source gas entered into the pit from one side of the first main surface and the second main surface easily goes outside from the other side of the first main surface and the second main surface from inside the pit. Thus, a uniform film can be easily formed on the surface of the first pit and the second pit in a short period of time. When the source gas is supplied to the inside the pit in the ALD method, increase in the pressure inside the pit is suppressed, and the source gas is supplied smoothly to inside the pit, a dense film (dielectric layer) can be easily formed, which is advantageous in reduction in the leak current in the electrolytic capacitor. Furthermore, when purging the source gas by the ALD method in the pit, the source gas can be purged smoothly, and excessive source gas components remaining in the dielectric layer can be suppressed. Thus, the purging time can be shortened to improve productivity. In electrolytic capacitor production, when the conductive polymer compound and the liquid component are permeated inside the pit, increase in the pressure inside the pit can be suppressed, the conductive polymer compound and the liquid component are permeated inside the pit smoothly, which is advantageous in reduction in the leak current in the electrolytic capacitor and ESR.

Figure 5:
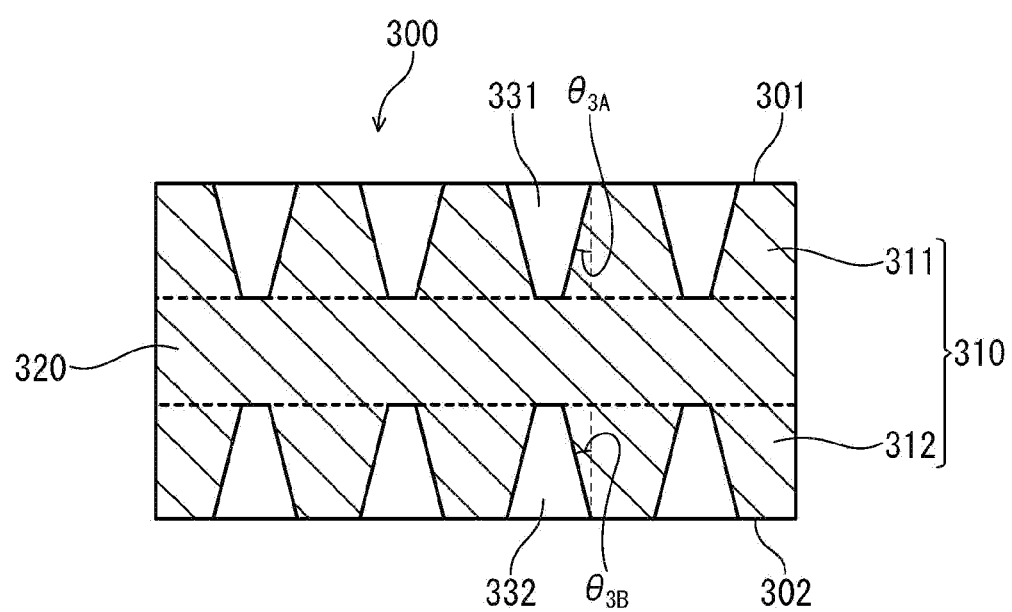
FIG. 5 A schematic cross sectional view illustrating an example of an anode body having a tunneled pit.

FIG. 5 is a schematic cross sectional view illustrating an example of an anode body. FIG. 5 shows a cross section of an anode body in a thickness direction of the porous portion.

As shown in FIG. 5, an anode body 300 has a porous portion 310, and a core part 320 continuous with the porous portion 310. The anode body 300 has a first main surface 301, and a second main surface 302 opposite to the first main surface 301. The porous portion 310 has a first porous portion 311 provided at the first main surface 301 side and a second porous portion 312 provided at the second main surface 302 side. The first porous portion 311 has a tunneled first pit 331, and the second porous portion 312 has a tunneled second pit 332. The first pit 331 and the second pit 332 are main pits.

The diameter of the first pit 331 is smaller at the core part 320 side than at the first main surface 301 side of the first porous portion 311. The wall surface of the first pit 331 is inclined relative to the thickness direction (direction perpendicular to the first main surface 301) of the first porous portion 311 in this manner. The first pit 331 has a circular truncated cone shape, and the length direction of the first pit 331 generally coincides with the thickness direction of the first porous portion.

The diameter of the second pit 332 is smaller at the core part 320 side than at the second main surface 302 side of the second porous portion 312. The wall surface of the second pit 332 is inclined relative to the thickness direction (direction perpendicular to the second main surface 302) of the second porous portion 312 in this manner. The second pit 332 has a circular truncated cone shape, and the length direction of the second pit 332 generally coincides with the thickness direction of the second porous portion 312.

In a cross section in the thickness direction of the porous portion 310 of the anode body 300, the wall surface of the first pit 331 and the thickness direction of the first porous portion 311 form an angle of (angle $\theta_{3A}$ in FIG. 5), for example, 0.01° or more and 2.8° or less, or 0.1° or more and 2.8° or less. In a cross section in the thickness direction of the porous portion 310 of the anode body 300, the wall surface of the second pit 332 and the thickness direction of the second porous portion 312 form an angle of (angle $\theta_{3B}$ in FIG. 5), for example, 0.01° or more and 2.8° or less, 0.1° or more and 2.8° or less.

The anode body in FIG. 5 is more advantageous in terms of strength. Furthermore, the pit diameter is large at the main surface side (pit opening side) of the porous portion, and therefore the conductive polymer compound or the conductive polymer compound and the liquid component can permeate into inside the porous portion, which is advantageous in reduction of ESR of the electrolytic capacitor.

The first pit and the second pit in FIG. 5 have a circular truncated cone shape, but it may have a truncated quadrangular pyramid, circular cone, or pyramid shape. The length direction of the first pit and the second pit in FIG. 5 generally coincides with the thickness direction of the first porous portion and the second porous portion, respectively, but may slightly incline toward the thickness direction of the first porous portion and the second porous portion in a range of 15° or less. The first pit and the second pit may further have a small pit and/or a branched pit to be described later.

Figure 6:
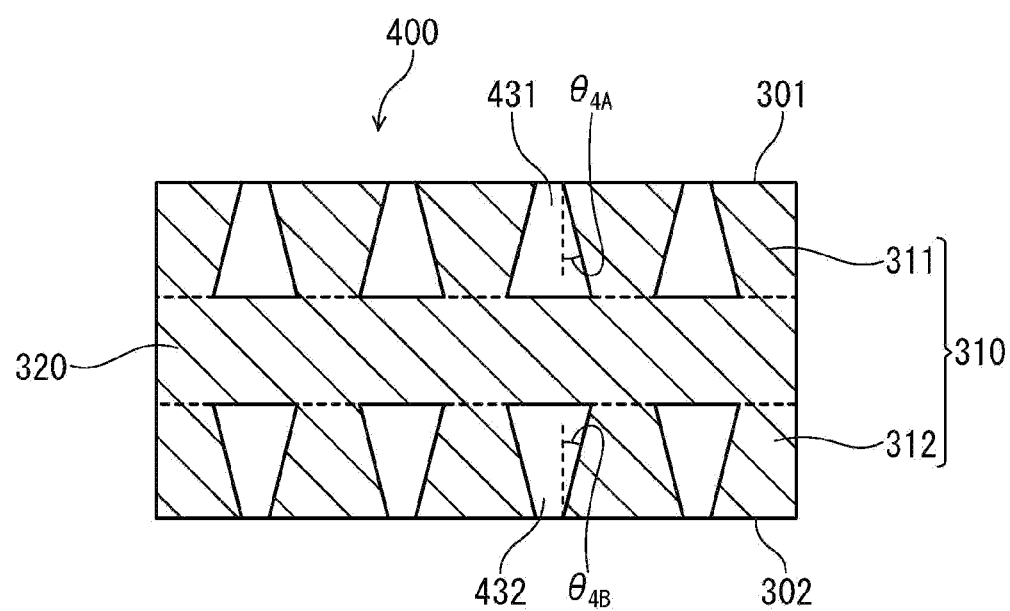
FIG. 6 A schematic cross sectional view illustrating another example of an anode body having a tunneled pit.

FIG. 6 is a schematic cross sectional view illustrating another example of an anode body. FIG. 6 shows a cross section in the thickness direction of the porous portion of the anode body. In FIG. 6, the same reference numerals are given to elements corresponding to those in FIG. 5, and for those elements same with those in FIG. 5, explanation is omitted.

In the anode body 400 shown in FIG. 6, the first porous portion 311 has tunneled first pits 431, and the second porous portion 312 has tunneled second pits 432. The first pit 431 and the second pit 432 are main pits. The first pit 431 diameter is larger at the core part 320 side than at the first main surface 301 side of the first porous portion 311. In this manner, the wall surface of the first pit 431 is inclined relative to the thickness direction (direction perpendicular to the first main surface 301) of the first porous portion 311. The first pit 431 has a circular truncated cone shape, and the length direction of the first pit 431 generally coincides with the thickness direction of the first porous portion 311.

The second pit 432 diameter is larger at the core part 320 side than at the second main surface 302 side of the second porous portion 312. In this manner, the wall surface of the second pit 432 is inclined relative to the thickness direction (direction perpendicular to the second main surface 302) of the second porous portion 312. The second pit 432 has a circular truncated cone shape, and the length direction of the second pit 432 generally coincides with the thickness direction of the second porous portion 312.

In a cross section in the thickness direction of the porous portion 310 of the anode body 400, the wall surface of the first pit 431 and the thickness direction of the first porous portion 311 form an angle of (angle $\theta_{4A}$ in FIG. 6), for example, 0.01° or more and 2.2° or less, or 0.1° or more and 2.2° or less. In a cross section in the thickness direction of the porous portion 310 of the anode body 400, the wall surface of the second pit 432 and the thickness direction of the second porous portion 312 form an angle of (angle $\theta_{4B}$ in FIG. 6), for example, 0.01° or more and 2.2° or less, 0.1° or more and 2.2° or less.

It is advantageous in that the anode body of FIG. 6 can be produced by subjecting a substrate to etching while suppressing dissolution of the substrate surface, which increases the capacitance of the electrode foil, and increases the capacity of the electrolytic capacitor.

The first pit and the second pit of FIG. 6 is a circular truncated cone, but it may also be a truncated quadrangular pyramid. The length direction of the first pit and the second pit of FIG. 6 generally coincides with the thickness direction of the first porous portion and the second porous portion, respectively, but it may also be inclined in a range of 15° or less relative to the thickness direction of the first porous portion and the second porous portion, respectively. The first pit and the second pit may further have a small pit and/or a branched pit described later.

Figure 7:
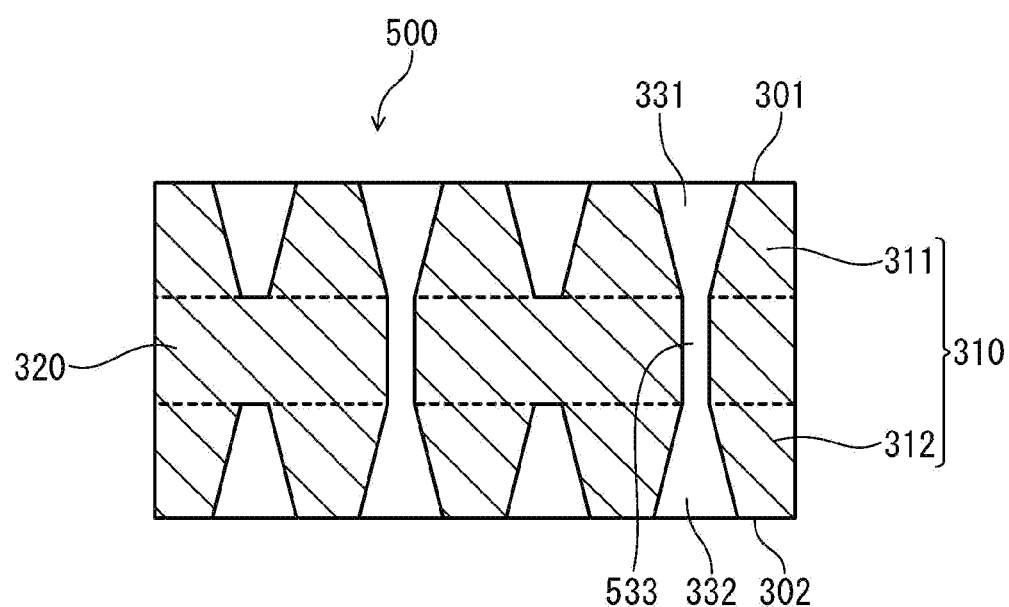
FIG. 7 A schematic cross sectional view illustrating still another example of an anode body having a tunneled pit.

FIG. 7 is a schematic cross sectional view illustrating still another example of the anode body. FIG. 7 shows a cross section in the thickness direction of the porous portion of the anode body. In FIG. 7, the same reference numerals are given to elements corresponding to those in FIG. 5, and for those elements same with those in FIG. 5, explanation is omitted.

In the anode body 500 shown in FIG. 7, a portion of the first pit 331 extends further from the first porous portion 311 toward the second porous portion 412, has a third pit 533 penetrating the core part 320, and is connected with a portion of the second pit 332. The ratio of the first pit having the third pit 533 (number ratio) relative to the entire first pit is, for example, 5% or more and 20% or less.

In FIG. 5 to FIG. 7, the first pit and the second pit have the same shape, but the first pit and the second pit may have a shape different from each other. The first pit and the second pit shown in FIG. 7 have the same shape as the first pit and the second pit shown in FIG. 5, but the shape is not limited thereto.

The tunneled pit may further include a small pit in a surface region of the porous portion. The small pit has a length shorter than that of the main pit, and the ratio of the small pit length relative to the main pit length is 0.7 or less, or it may be 0.6 or less. The above-described surface region of the porous portion means a region where a depth from the porous portion surface is 10 μm or less. The small pit is a pit that is present only in the region where the depth from the porous portion surface is 10 μm or less. The surface region of the porous portion is, for example, a region having a thickness of 20% or less of the thickness of the porous portion, and the thickness of the porous portion is, for example, 50 μm or more. The small pit may be formed by the effects from rolling process of the metal foil. In this case, a small pit with a relatively large inclination angle relative to the thickness direction of the porous portion may be formed. By including the small pit, the surface area of the anode body can be further increased, and the capacitance can be further increased. The small pit may not be connected to the main pit, or may be connected to the main pit. In view of ensuring the strength of the anode body, the small pit preferably is present by a smaller percentage compared with the main pit, and the number of the small pit is, for example, preferably 5% or more and 20% or less of the number of the main pit.

The main pit length is an average length of any 20 main pits obtained by using an SEM image of cross sections of the porous portion of the electrode foil (anode body) in the thickness direction. The small pit length is an average length of any 10 small pits present in the region where the depth from the porous portion surface is 10 μm or less obtained by using an SEM image of cross sections of the porous portion of the electrode foil (anode body) in the thickness direction.

The small pit may have a large inclination angle than that of the main pit relative to the thickness direction of the porous portion. When the small pit has a large inclination angle, a small pit with a relatively long length size can be present at the porous portion surface region, and the surface area of the anode body may easily increase, and the capacitance can be further increased. In a cross section in the thickness direction of the porous portion of the anode body, the length direction of the small pit and the thickness direction of the porous portion may form an angle of (acute angle) 5° or more and 88° or less, 10° or more and 85° or less, more than 45° and 85° or less, 50° or more and 85° or less.

The angle formed with the length direction of the small pit and the thickness direction of the porous portion (acute angle) can be determined by measuring the above-described angle for any 10 small pits using an SEM image of cross sections of the porous portion of the electrode foil (anode body) in the thickness direction, and calculating the average value.

The tunneled pit may further include a branched pit branching and extending from the main pit. By including the branched pit, the surface area of the anode body increases furthermore, and the capacitance can be further increased. Furthermore, in view of ensuring the anode body strength, in a cross section in the thickness direction of the porous portion of the anode body, the length direction of the main pit and the length direction of the branched pit may form an angle of 70° or more and 110° or less, or 80° or more and 100° or less. The branched pit has a length of, for example, 5% or more and 25% or less of the main pit length.

The angle formed by the length direction of the main pit and the length direction of the branched pit can be determined by measuring the above-described angle of any 10 branched pits using an SEM image of cross sections of the porous portion of the electrode foil (anode body) in the thickness direction, and calculating the average value.

Figure 8:
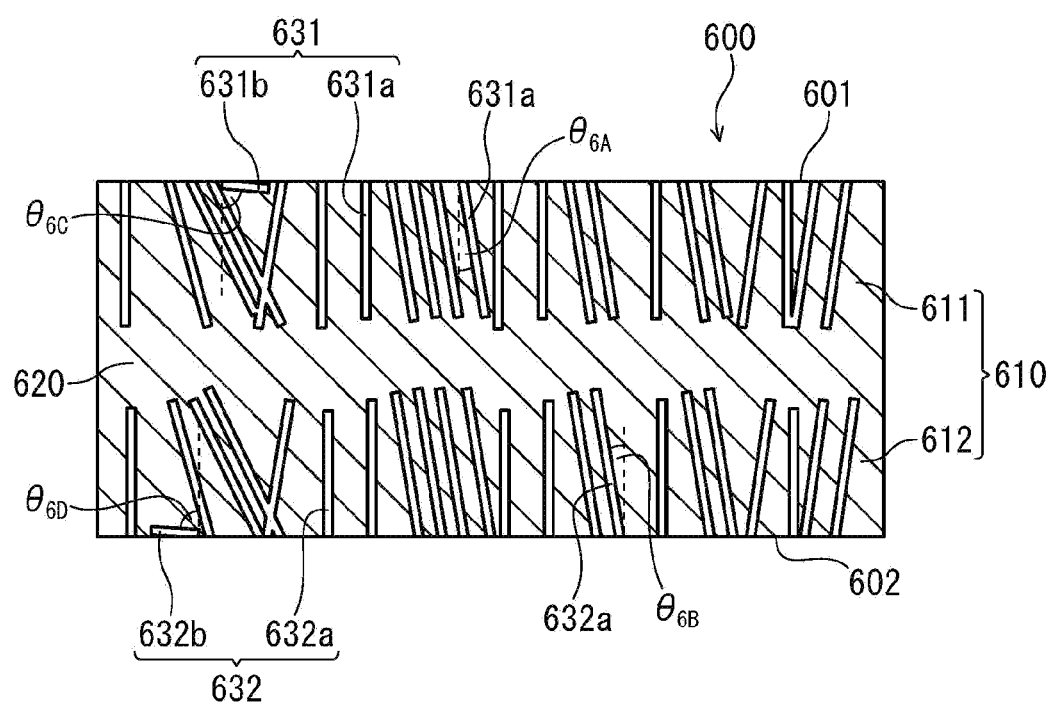
FIG. 8 A schematic cross sectional view illustrating an example of an anode body including a porous portion having a main pit and a small pit.

FIG. 8 is a schematic cross sectional view illustrating an example of an anode body including a porous portion having a main pit and a small pit. FIG. 8 shows a cross section in the thickness direction of the porous portion of the anode body.

The anode body 600 has a porous portion 610, and a core part 620 continuous with the porous portion 610. The anode body 600 has a first main surface 601, and a second main surface 602 opposite the first main surface 601. The porous portion 610 has a first porous portion 611 provided at the first main surface 601 side, and a second porous portion 612 provided at the second main surface 602 side with a core part 620 interposed therebetween. The first porous portion 611 has tunneled first pits 631, and the second porous portion 612 has tunneled second pits 632.

As shown in FIG. 8, the first pit 631 includes a main pit 631a and a small pit 631b. The small pit 631b is present in a surface region (region where the depth from the main surface 601 of the first porous portion 611 is 10 μm or less) of the first porous portion 611, and has a length of 70% or less of the length of the main pit 631a. The second pit 632 includes a main pit 632a and a small pit 632b. The small pit 632b is present in a surface region (region where the depth from the main surface 602 of the second porous portion 612 is 10 μm or less) of the second porous portion 612, and has a length of 70% or less of the length of the main pit 632a.

In a cross section in the thickness direction of the porous portion 610 of the anode body 600, the length direction of the main pit 631a and the thickness direction (direction perpendicular to the first main surface 601) of the first porous portion 611 form an angle of (angle θ6A in FIG. 8), for example, 45° or less. In a cross section in the thickness direction of the porous portion 610 of the anode body 600, the length direction of the main pit 632a and the thickness direction (direction perpendicular to the second main surface 602) of the second porous portion 612 form an angle of (angle $\theta_{6B}$ in FIG. 8), for example, 45° or less.

In a cross section in the thickness direction of the porous portion 610 of the anode body 600, the length direction of the small pit 631b and the thickness direction of the first porous portion 611 may form an angle of (angle $\theta_{6C}$ in FIG. 8), 30° or more and 88° or less, or more than 45° and 85° or less. In a cross section in the thickness direction of the porous portion 610 of the anode body 600, the length direction of the small pit 632b and the thickness direction of the second porous portion 612 may form an angle of (angle $\theta_{6D}$ in FIG. 8), 30° or more and 88° or less, or more than 45° and 85° or less. The first pit and the second pit of FIG. 8 are cylindrical, but the pit shape is not limited thereto, and it can be a prism.

Figure 9:
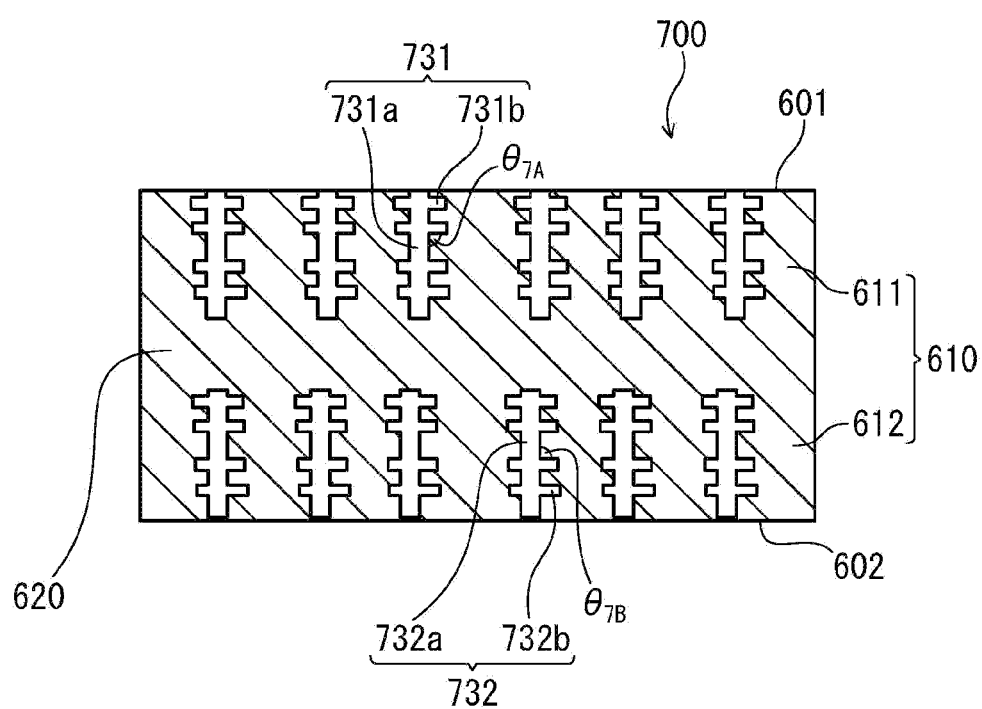
FIG. 9 A schematic cross sectional view illustrating an example of an anode body including a porous portion having a main pit and a branched pit.

FIG. 9 is a schematic cross sectional view illustrating an example of an anode body having a main pit and a branched pit. FIG. 9 shows a cross section in the thickness direction of the porous portion of the anode body. In FIG. 9, the same reference numerals are given to elements corresponding to those in FIG. 8, and for those elements same with those in FIG. 8, explanation is omitted.

As shown in FIG. 9, in the anode body 700, the first porous portion 611 has tunneled first pits 731, and the second porous portion 612 has tunneled second pits 732. The first pit 731 includes a main pit 731a, and a branched pit 731b branching and extending from the main pit 731a. The second pit 732 includes a main pit 732a, and a branched pit 731b branching and extending from the main pit 731a.

In a cross section in the thickness direction of the porous portion 610 of the anode body 700, the length direction of the main pit 731a generally coincides with the thickness direction of the first porous portion 611 (direction perpendicular to the first main surface 601). In a cross section in the thickness direction of the porous portion 610 of the anode body 700, the length direction of the main pit 732a generally coincides with the thickness direction of the second porous portion 612 (direction perpendicular to the second main surface 602). The main pit (length direction) may be inclined in a range of 15° or less relative to the thickness direction of the porous portion.

In a cross section in the thickness direction of the porous portion 610 of the anode body 700, the length direction of the main pit 731a and the length direction of the branched pit 731b form an angle of (angle $\theta_{7A}$ in FIG. 9), for example, 70° or more and 110° or less, preferably 85° or more, 95° or less. In a cross section in the thickness direction of the porous portion 610 of the anode body 700, the length direction of the main pit 732a and the length direction of the branched pit 732b form an angle of (angle $\theta_{7B}$ in FIG. 9), for example, 70° or more and 110° or less, preferably 85° or more and 95° or less. The first pit and the second pit of FIG. 9 is cylindrical, but the pit shape is not limited thereto, and can be a prism.

[Electrolytic Capacitor]

An electrolytic capacitor in an embodiment of the present invention includes a capacitor element. The capacitor element includes the above-described electrode foil for an electrolytic capacitor, and a conductive polymer compound covering at least a portion of the dielectric layer. A cathode body can be further disposed so as to face the above-described electrode foil (porous portion) for an electrolytic capacitor. At this time, a conductive polymer compound interposed between the electrode foil (porous portion) and the cathode body will suffice. In this way, the conductive polymer compound and the cathode body can form a cathode portion.

(Conductive Polymer Compound)

Examples of the conductive polymer compound include a π conjugated polymer. Examples of the conductive polymer compound include polypyrrole, polythiophene, polyfuran, polyaniline, polyacetylene, polyphenylene, polyphenylene vinylene, polyacene, and polythiophene vinylene. These may be used singly, or two or more kinds may be used in combination, or may be a copolymer of two or more monomers. The conductive polymer compound has a weight-average molecular weight of, for example, 1000 to 100000.

In this specification, polypyrrole, polythiophene, polyfuran, polyaniline, etc. means a polymer with a basic skeleton of polypyrrole, polythiophene, polyfuran, polyaniline, etc. respectively. Thus, polypyrrole, polythiophene, polyfuran, polyaniline, etc. may include derivatives thereof. For example, polythiophene includes poly(3,4-ethylenedioxythiophene) and the like.

The conductive polymer compound may be doped with a dopant. The dopant may be polyanion. Specific examples of the polyanion include polyvinyl sulfonate, polystyrene sulfonate, polyaryl sulfonate, polyacryl sulfonate, polymethacryl sulfonate, poly(2-acrylamide-2-methyl propane sulfonate), polyisoprene sulfonate, and polyacrylate. These may be used singly, or two or more kinds may be used in combination. These polymer dopants may be a homopolymer or a copolymer of two or more kinds of monomers. Preferably, polystyrene sulfonate-based polyanion is used.

For example, at least a portion of the dielectric layer surface is covered with a solid electrolyte layer including at least a conductive polymer compound. The solid electrolyte layer may include, along with the conductive polymer compound, a dopant. In the electrolytic capacitor, the conductive polymer compound (solid electrolyte layer) forms a portion of the cathode portion along with the cathode body. The solid electrolyte layer may further include, as necessary, an additive.

(Liquid Component)

The electrolytic capacitor may include a capacitor element and a liquid component. The liquid component is in contact with the dielectric layer (first layer) directly or with a conductive polymer compound interposed therebetween. The liquid component may be present along with the conductive polymer compound, between the anode body (dielectric layer) and the cathode body.

The liquid component may be a non-aqueous solvent, or a liquid electrolyte including a non-aqueous solvent and an ionic substance (solute (e.g., organic salt)) dissolved therein. The non-aqueous solvent may be an organic solvent or an ionic liquid. When the porous portion is immersed in the liquid electrolyte, the liquid electrolyte restores damages of the dielectric layer. At this time, the presence of the interface layer including a first element can easily form an excellent film. Thus, the leak current can be decreased even more.

A preferable non-aqueous solvent is a high boiling point solvent. For example, polyol compounds, cyclic sulfone compounds such as sulfolane; lactone compounds such as γ-butyrolactone; amide compounds such as N-methyl acetamide, N,N-dimethylformamide, and N-methyl-2-pyrrolidone; ester compounds such as methyl acetate; carbonate compounds such as propylene carbonate; ether compounds such as 1,4-dioxane; ketone compound such as methyl ethyl ketone; and formaldehyde.

Preferably, the liquid component includes a polyol compound. The conductive polymer compound is easily dispersed in the polyol compound in an excellent state, the conductive polymer compound can easily go into the pits, and the wall surface of the pit can be easily covered with the conductive polymer compound. In this manner, contacts between the dielectric layer and the conductive polymer compound can be easily improved.

Preferably, the polyol compound includes at least one selected from the group consisting of a glycol compound and a glycerine compound (hereinafter, also referred to as glycol compound). When the liquid component includes a glycol compound and the like, the conductive polymer compound easily swells, and the orientation of the conductive polymer compound improves, the electrical conductivity of the conductive polymer compound (solid electrolyte layer) improves, and ESR is easily reduced. The glycol compound and the like has a relatively high boiling point, which suppresses permeation from the electrolytic capacitor sealing portion to the outside, reduction in film restoration functions by solvent reduction, and reduction in the withstand voltage.

The glycol compound includes alkylene glycol, polyalkylene glycol, and the like. The polyalkylene glycol has a weight-average molecular weight of, for example, 100 or more and 3000 or less, or 100 or more and 2000 or less. The polyethylene glycol has a weight-average molecular weight of, for example, 100 or more and 600 or less, or 100 or more and 400 or less. Specifically, ethylene glycol, propylene glycol, butylene glycol, hexylene glycol, diethylene glycol, and triethylene glycol are used. Ethylene glycol is preferably used because it has a low viscosity among glycol compounds, and acid components and base components are easily dissolved. Ethylene glycol has a high thermal conductivity, and excellent heat-releasing characteristics, and therefore is preferable in view of improvement in heat resistance.

The glycerine compound includes glycerine, polyglycerine, and derivatives thereof. Examples of the derivatives of glycerine or polyglycerine include esters in which a hydroxy group of at least a portion of glycerine or polyglycerine is esterified; and alkylene oxide adducts of glycerine or polyglycerine.

The polyglycerine includes a repeated structure of glycerine units. The repetition number of glycerine unit included in polyglycerine is, for example, 2 or more and 20 or less, 2 or more and 12 or less, may be 2 or more and 10 or less, or 2 or more and 6 or less. Examples of the polyglycerine include diglycerine and triglycerine. Preferably, polyglycerine has a weight-average molecular weight of, for example, 200 or more and 3000 or less, or 300 or more and 800 or less.

The liquid component may include an acid component (anion) and a base component (cation). The acid component and the base component may form a salt (solute). The acid component contributes to film restoration functions. Examples of the acid component include organic carboxylic acid and inorganic acid. Examples of the inorganic acid include phosphoric acid, boric acid, and sulfuric acid.

The organic carboxylic acid compound may include at least one selected from the group consisting of an aromatic carboxylic acid compound and an aliphatic carboxylic acid compound.

The aliphatic carboxylic acid compound includes saturated aliphatic carboxylic acid, and unsaturated aliphatic carboxylic acid. The saturated aliphatic carboxylic acid includes, for example, oxalic acid, malonic acid, succinic acid, glutaric acid, adipic acid, azelaic acid, sebacic acid, 1,6-decane dicarboxylic acid, 1,7-octane dicarboxylic acid, formic acid, acetic acid, propionic acid, butyric acid, isobutyric acid, valeric acid, caproic acid, enanthic acid, caprylic acid, pelargonic acid, capric acid, lauric acid, myristic acid, stearic acid, and behenic acid. The unsaturated aliphatic carboxylic acid includes, for example, acrylic acid, methacrylic acid, maleic acid, fumaric acid, and oleic acid. The aliphatic carboxylic acid compound may be used singly, or two or more kinds thereof may be used in combination.

The aromatic carboxylic acid compound includes, for example, phthalic acid (ortho), isophthalic acid (meta), terephthalic acid (para), benzoic acid, salicylic acid, trimellitic acid, and pyromellitic acid. The aromatic carboxylic acid compound may be used singly, or two or more kinds thereof may be used in combination.

In view of improvement in film restoration functions and thermal stability, the organic carboxylic acid compound preferably includes at least one selected from the group consisting of benzoic acid, azelaic acid, sebacic acid, 1,6-decane dicarboxylic acid, and 1,7-octane dicarboxylic acid.

Examples of the base component include primary to tertiary amine compounds. Examples of the amine compound include monoalkylamine such as ethyl amine, dialkyl amine such as diethyl amine, and trialkylamine such as triethyl amine. For the base component, a compound having an alkyl-substituted amidine group such as an imidazole compound (including quaternized product) may be used.

The organic salt means at least one of the anion and the cation is a salt containing an organic material. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

Preferably, the liquid component includes more of the acid component than the base component. The acid component decreases the pH of the liquid electrolyte from an initial period, and suppresses dedoping of the dopant from the conductive polymer. By including more of the acid component than the base component, dedoping (deterioration of the solid electrolyte) of dopants from the conductive polymer can be suppressed. Preferably, because the acid component contributes to the film restoration functions of the liquid component, the acid component is included more than the base component.

In view of suppressing the dedoping of the dopant from the conductive polymer (solid electrolyte layer deterioration suppression), and improvement in the film restoration functions, the molar ratio of the acid component relative to the base component: (acid component/base component) is, for example, 1.1 or more, preferably 1.5 or more, more preferably 1.5 or more and 10 or less.

In view of suppressing the dedoping of the dopant from the conductive polymer, the liquid component may have a pH of 6 or less, or 1 or more and 5 or less.

(Cathode Body)

For the cathode body, a metal foil may be used. The type of metal is not particularly limited, but preferably, valve metals such as aluminum, and tantalum, niobium or an alloy including a valve metal is used. As necessary, the metal foil surface may be roughened. The metal foil surface may be provided with a chemically formed film, or may be provided with a film of a metal different from the metal forming the metal foil (different metal) or of a non-metal. For the different metal or non-metal, for example, metals such as titanium or non-metals such as carbon may be used.

(Separator)

When a metal foil is used for the cathode body, a separator may be disposed between the metal foil and the anode body. Examples of the separator include, without particular limitation, for example, nonwoven fabric including fiber of cellulose, polyethylene terephthalate, vinylon, or polyamide (e.g., aromatic polyamide such as aliphatic polyamide, and aramid).

(Others)

The electrolytic capacitor having at least one capacitor element will suffice, or it may have a plurality of capacitor elements. The number of the capacitor element included in the electrolytic capacitor can be determined in accordance with applications.

[Method for Producing Electrode Foil for Electrolytic Capacitor]

The method for producing an electrode foil for an electrolytic capacitor includes a first step of preparing an anode body having a porous portion and a core part continuous with the porous portion. Furthermore, the above-described production method includes a second step of forming an interface layer covering the surface of a metal skeleton forming the porous portion, and a third step of forming a dielectric layer continuous with the interface layer. The interface layer includes a first element, and the first element is at least one selected from the group consisting of sulfur, nitrogen, and phosphorus (First Step)

In the first step, for example, a metal foil including a first metal is subjected to etching to roughen the metal foil. A plurality of pits or pores is formed on the surface of the metal foil by roughening. The etching is performed by immersing the metal foil in an etching liquid (acid solution). The etching may be, for example, a DC etching with a direct current or an AC etching with an alternating current.

Although the kind of the first metal is not particularly limited, a valve metal such as aluminum (Al), tantalum (Ta), or niobium (Nb), or an alloy containing the valve metal can be used from the viewpoint of easily forming the second layer by chemical formation. Copper (Cu) may be contained in the metal foil in order to effectively form the porous portion. The metal foil may have a thickness of, without limitation, for example, 15 μm or more and 300 μm or less.

(Second Step)

In the second step, the anode body may be immersed in a first treatment liquid including a first element. For example, the anode body may be immersed in the first treatment liquid, or the anode body may be sprayed with the first treatment liquid. In view of improvement in productivity, the second step may be performed in the middle of the first step.

For the first treatment liquid, for example, an aqueous solution including the first element is used. The aqueous solution is an alkaline solution. In view of suppressing damages to the metal skeleton, the alkaline solution preferably has a mild alkalinity. The pH of the alkaline solution is set to, for example, 8 to 13. A solvent of the alkaline solution preferably contains water as a main component, and 80 mass % or more of the solvent may be water. When the treatment time with the first treatment liquid is short within 5 minutes, the aqueous solution including the first element may be an acid solution. When it is an acid solution, in view of suppressing damages to the metal skeleton, the acid solution preferably includes 0.2 mass % or more of aluminum ion.

For the first treatment liquid, for example, an aqueous solution of a compound including the first element is used. Examples of the compound including sulfur include sulfuric acid. Examples of the compound including nitrogen include nitric acid. Examples of the compound including phosphorus include phosphoric acid, ammonium dihydrogen phosphate, phosphonic acid, and phosphinic acid.

The first treatment liquid contains the first element by, in view of improvement in the capacity of the electrolytic capacitor, preferably a trace amount, or may be, for example, 0.01 ppm or more and 500 ppm or less, or 0.1 ppm or more and 100 ppm or less. When the first treatment liquid is an acid aqueous solution, and the step of immersing the anode body in the first treatment liquid is performed in a short period of time, the first treatment liquid may contain the compound including the first element by, 0.1 mass % or more and 10 mass % or less, or 0.5 mass % or more and 5 mass % or less.

In the second step, the anode body to which the first treatment liquid is attached may be dried or heated. The heating temperature is, for example, 200° C. or more and 550° C. or less, preferably 250° C. or more and 500° C. or less. At this time, the heating atmosphere may be an oxidizing atmosphere, but a non-oxidizing atmosphere is preferable from the viewpoint of forming the interface layer as thin as possible, uniform, and stable. The non-oxidizing atmosphere may be an atmosphere in which a mole fraction of an inert gas (rare gas such as Ar or He, nitrogen, or the like) exceeds 90%, a reduced-pressure atmosphere, or the like. The heating causes unstable oxygens not bonded with the first metal to be hydrogenated, generates many surface hydroxyl groups, and forms a stable interface layer.

(Third Step)

In the third step, the dielectric layer may be formed by a gas phase method. When forming a dielectric layer with a large thickness, the dielectric layer may be formed by a liquid phase method such as a sol-gel method. Examples of the gas phase method include a vacuum deposition method, a chemical vapor deposition method, a mist vapor deposition method, a sputtering method, a pulse laser deposition method, and an atomic layer deposition method (ALD method). In particular, the ALD method is excellent in that it can form a dense dielectric layer even in the deep portion of the porous portion. The first layer may have a thickness of, without particular limitation, for example, 0.5 nm or more and 250 nm or less, or 5 nm or more and 100 nm or less.

The ALD method is a film forming method in which a second metal-containing a source gas and an oxidant are alternately supplied into a reaction chamber with an object placed therein, so that a dielectric layer (first layer) containing an oxide of the second metal can be formed on a surface of the object. According to the ALD method that allows self-limiting film growth, the second metal can deposit on the atomic level on a surface of the object. Therefore, by controlling the number of cycles each consisting of: source gas supply→source gas purge→oxidant supply→oxidant purge, the thickness of the first layer can be controlled. In short, the ALD method can easily control the thickness of the dielectric layer to be formed.

The ALD method can be performed under a temperature condition ranging from 100° C. to 400° C., as compared with CVD generally performed under a temperature condition ranging from 400° C. to 900° C. In short, the ALD method is excellent in that it can suppress the thermal damage to the metal foil.

Examples of the oxidant used in the ALD method include water, oxygen, and ozone. The oxidant may be supplied into the reaction chamber, as a plasma produced from the oxidant.

The second metal is supplied into the reaction chamber, as a gas of a precursor including the second metal. The precursor is, for example, an organic metal compound containing the second metal. By supplying as above, the second metal can be easily chemically adsorbed onto the object. As the precursor, various organic metal compounds used conventionally for the ALD method can be used.

Examples of the precursor including Al include trimethyl aluminum ($(CH_3)_3Al$). Examples of the precursor including Zr include bis(methyl-η 5-cyclo pentadienyl) methoxy methyl zirconium ($Zr(CH_3C_5H_4)_2CH_3OCH_3$), tetrakis(dimethyl amide)zirconium (IV) ($[(CH_3)_2N]_4Zr$), tetrakis(ethyl methyl amide) zirconium (IV) ($Zr(NCH_3C_2H_5)_4$), and zirconium (IV) t-butoxide ($Zr[OC(CH_3)_3]_4$).

Examples of the precursor including Ta include (t-butylamide) tris(ethylmethylamino) tantalum (V) ($C_{13}H_{33}N_4Ta$, TBTEMT) tantalum (V) pentaethoxide ($Ta(OC_2H_5)_5$), (t-butylamide) tris(diethylamino) tantalum (V) (($(CH_3)_3CNTa$ ($N(C_2H_5)_2)_3$), and pentakis(dimethylamino) tantalum (V) ($Ta(N(CH_3)_2)_5$).

Examples of the precursor including Nb include niobium (V) ethoxide (Nb ($OCH_2CH_3)_5$), and tris(diethylamide)(t-butylimide) niobium (V) ($C_{16}H_{39}N_4Nb$).

Examples of the precursor including Si include N-sec-butyl (trimethylsilyl) amine ($C_7H_{19}NSi$), 1,3-diethyl-1,1,3,3-tetramethyldisilazane ($C_8H_{23}NSi_2$), 2,4,6,8,10-pentamethylcyclopentasiloxane (($(CH_3SiHO)_5$), pentamethyldisilane (($(CH_3)_3SiSi$ ($CH_3)_2H$), tris (isopropoxy) silanol ($[(H_3C)_2CHO]_3SiOH$), chloropentamethyldisilane (($(CH_3)_3SiSi$ ($CH_3)_2Cl$), dichlorosilane ($SiH_2Cl_2$), tridimethylaminosilane ($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane (($Si(CH_3)_2)_6$), silicon tetrachloride ($SiCl_4$), and silicon tetrabromide ($SiBr_4$).

Examples of the precursor including Ti include bis(t-butylcyclopentadienyl) titanium (IV) dichloride ($C_{18}H_{26}C_{12}Ti$), tetrakis(dimethylamino) titanium (IV) ($[(CH_3)_2N]_4Ti$, TDMAT), tetrakis(diethylamino) titanium (IV) ($[C_2H_5)_2N]_4Ti$), tetrakis (ethylmethylamino) titanium (IV) ($Ti[N(C_2H_5)(CH_3)]_4$), titanium (IV) (diisopropoxide-bis (2,2,6,6-tetramethyl-3,5-heptanedioate ($Ti[OCC(CH_3)_3CHCOC(CH_3)_3]_2(OC_3H_7)_2$), titanium tetrachloride ($TiCl_4$), titanium (IV) isopropoxide ($Ti[OCH(CH_3)_2]_4$), and titanium (IV) ethoxide ($Ti[O(C_2H_5)]_4$).

Examples of the precursor including hafnium include hafnium tetrachloride ($HfCl_4$), tetrakis dimethylamino hafnium $Hf[N(CH_3)_2]_4$), tetrakis ethylmethyl amino hafnium ($Hf[N(C_2H_5)(CH_3)]_4$), tetrakis diethylamino hafnium ($Hf[N(C_2H_5)_2]_4$), and hafnium t-butoxide ($Hf[OC(CH_3)_3]_4$)

(Step (a))

The third step may further include a step (a) of chemically forming (anodization) an anode body having an interface layer on its surface and a first layer. A second layer can be formed between the metal skeleton and the first layer in this manner. The second layer has a thickness T2, which can be controlled by a voltage applied to the anode body during the chemical formation. The chemical formation solution is not particularly limited, but for example, a diammonium adipate aqueous solution can be used. In this case, a valve metal suitable for chemical formation is preferably used as the first metal.

According to the ALD method, a thin and uniform dielectric layer (first layer) can be formed. However, actually the surface of the deep portion of the pit included in the porous portion may have a macroscopic damage such as a pinhole or a fine damage such as a lattice damage. When the second layer is formed, the ionized first metal diffuses to the first layer, and thus, an action of restoring the damage of the first layer is achieved. As a result, a dielectric layer having a uniform thickness with a reduced damage such as a pinhole is formed as a whole. Thus, the capacity of the electrolytic capacitor is increased, the natural potential of the anode body is increased, and the withstand voltage is improved.

[Method for Producing Electrolytic Capacitor]

The method for producing an electrolytic capacitor in an embodiment of the present invention includes the method for producing an electrode foil for an electrolytic capacitor (first step to third step), and a fourth step of covering at least a portion of the dielectric layer with a conductive polymer compound. The above-described production method may further include a step of disposing a cathode body so as to face the electrode foil for an electrolytic capacitor. At this time, a conductive polymer compound may be interposed between the electrode foil and the cathode body. In this manner, the cathode portion can be formed with the conductive polymer compound and the cathode body.

(Fourth Step)

In the fourth step, the electrode foil may be immersed in a second treatment liquid including a conductive polymer compound. The second treatment liquid may be attached to the dielectric layer to form a solid electrolyte layer. The second treatment liquid may be a solution of a conductive polymer compound, or a dispersion liquid of a conductive polymer compound. Preferably, the second treatment liquid includes the conductive polymer compound and the above-described liquid component. In this case, the dielectric layer surface can be covered with a solid electrolyte layer (conductive polymer compound), and the anode body (porous portion) can be immersed in a liquid component. When the liquid component includes a polyol compound, the conductive polymer compound is dispersed in a good state in the second treatment liquid, the conductive polymer compound easily goes into the pits, and the wall surface of the pit is easily covered with the conductive polymer compound.

Figure 11:
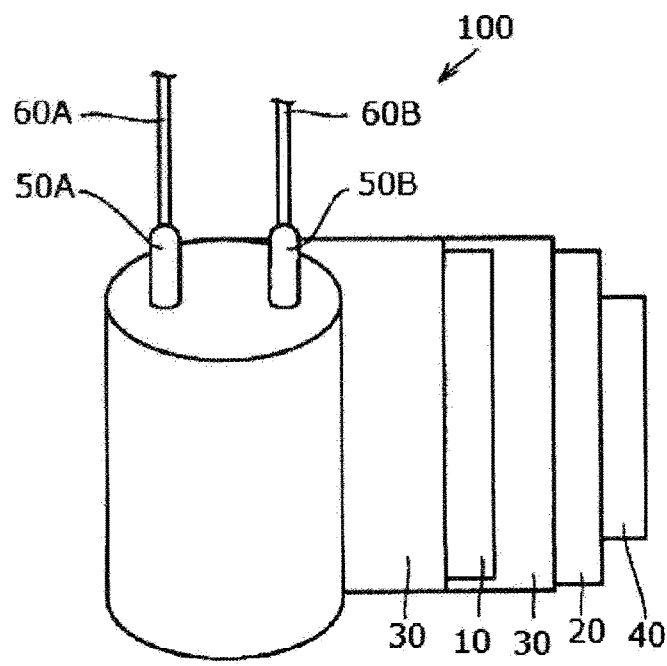
FIG. 11 A perspective view schematically showing a configuration of a wound body included in the electrolytic capacitor.

When the anode body having the dielectric layer is the anode foil illustrated in FIGS. 1 and 3, the wound body 100 illustrated in FIG. 11 may be prepared before the cathode portion is formed. FIG. 11 is an exploded diagram showing a configuration of the wound body 100.

In the case of fabricating the wound body 100, in addition to the anode foil 10, a cathode foil 20 is prepared. Likewise for the anode foil 10, a metal foil can be used for the cathode foil 20. The metal forming the cathode foil 20 is not limited to a specific kind, but may be a valve action metal, such as Al, Ta, and Nb, or an alloy containing a valve action metal. The surface of the cathode foil 20 may be roughened, if necessary.

Next, the anode foil 10 and the cathode foil 20 are wound, with a separator 30 interposed therebetween. One end of a lead tab 50A or 50B is connected to the anode foil 10 and the cathode foil 20, respectively, and the wound body 100 is formed by winding together with the lead tabs 50A and 50B. To the other ends of the lead tabs 50A are 50B, lead wires 60A and 60B are connected, respectively.

The separator 30 is not particularly limited, and may be, for example, a nonwoven fabric mainly composed of cellulose, polyethylene terephthalate, vinylon, aramid fiber, or the like.

Next, a winding stop tape 40 is disposed on the outer surface of the cathode foil 20 positioned at the outermost layer of the wound body 100, to secure the end of the cathode foil 20 with the winding stop tape 40. When the anode foil 10 is prepared by cutting from a large-sized foil, in order to provide a dielectric layer on the cut surface, chemical formation may be further applied to the wound body 100. At this time, a second layer may be formed.

The wound body 100 is immersed in the above-described second treatment liquid. The method is not particularly limited, and for example, the wound body 100 can be immersed in the above-described second treatment liquid contained in a vessel, or the above-described second treatment liquid may be dropped onto the wound body 100. The immersion may be performed in an atmosphere with a reduced pressure ranging, for example, from 10 kPa to 100 kPa, preferably from 40 kPa to 100 kPa.

Figure 10:
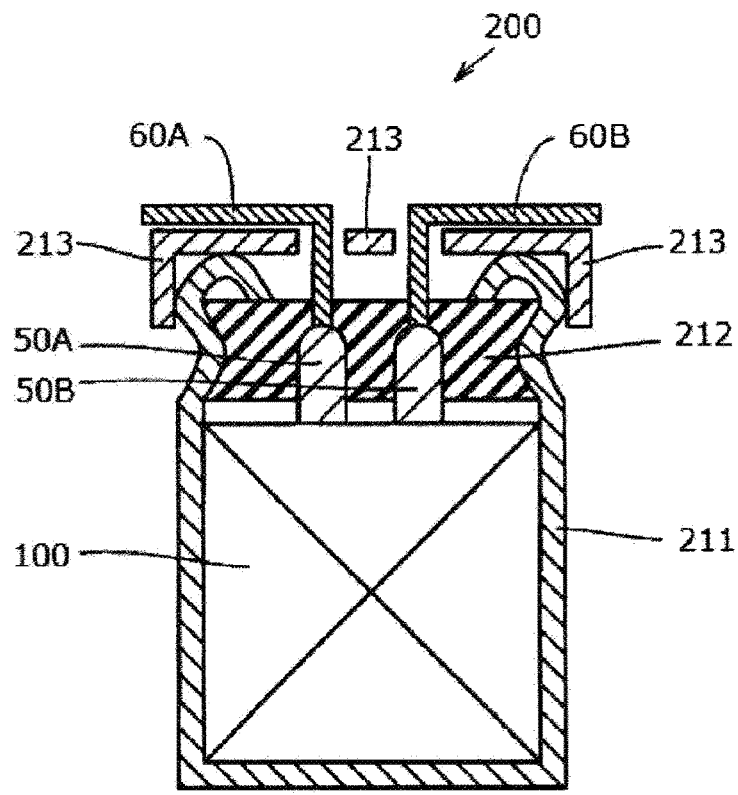
FIG. 10 A schematic cross sectional view of an electrolytic capacitor.

Next, by sealing the wound body 100, an electrolytic capacitor 200 as illustrated in FIG. 10 can be obtained. In order to manufacture the electrolytic capacitor 200, the wound body 100 is first housed in a bottomed case 211 such that the lead wires 60A and 60B are positioned on an opening side of the bottomed case 211. The material of the bottomed case 211 may be a metal, such as aluminum, stainless steel, copper, iron, and brass, or an alloy thereof.

Next, a sealing member 212 with the lead wires 60A and 60B passing therethrough is arranged above the wound body 100, so that the wound body 100 is sealed in the bottomed case 211. The sealing member 212 of a material with insulating properties will suffice, and preferably it is an elastic body. Among these materials, silicone rubber, fluoro rubber, ethylene propylene rubber, Hypalon rubber, butyl rubber, isoprene rubber, and the like, having high heat resistance, are preferable.

Next, a lateral drawing is applied to the bottomed case 211 near the end of its opening, and the opening end is crimped onto the sealing member 212 and curled. Lastly, sealing is completed by disposing a seat plate 213 at the curled portion. Thereafter, an aging treatment may be performed while a rated voltage is being applied.

Although the above embodiment describes a wound electrolytic capacitor, the scope of application of the present invention is not limited thereto, and is applicable to other electrolytic capacitors, such as a laminated electrolytic capacitor.

INDUSTRIAL APPLICABILITY

According to the present disclosure, it is possible to obtain an electrode foil for an electrolytic capacitor, an electrolytic capacitor, and a production method therefor which can sufficiently reduce a leak current. Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: anode foil
20: cathode foil
30: separator
40: winding stop tape
50A, 50B: lead tab
60A, 60B: lead wire
100: wound body
110: anode body 111: core material portion
112: porous portion
120: dielectric layer
121: first layer
122: second layer
130: interface layer
200: electrolytic capacitor
211: bottomed case
212: sealing member
213: seat plate
300,400,500,600,700: anode body
301,601: first main surface
302,602: second main surface
310,610: porous portion
311,611: first porous portion
312,612: second porous portion
320,620: core part
331,431,631,731: first pit
332,432,632,732: second pit
533: third pit
631a,632a,731a,732a: main pit
631b,632b: small pit
731b,732b: branched pit

The invention claimed is:

1. An electrode foil for an electrolytic capacitor comprising: an anode body having a porous portion and a core part continuous with the porous portion,
a dielectric layer covering a surface of a metal skeleton forming the porous portion, wherein:
an interface layer including a first element is present between the metal skeleton and the dielectric layer,
the first element is at least one selected from the group consisting of sulfur, phosphorous, and nitrogen,
the porous portion has a plurality of tunneled pits,
each of the plurality of tunneled pits includes at least a main pit extending from a surface side of the porous portion to a side of the core part,
the main pit has a wall surface declined relative to a length direction of the main pit at a cross section in a thickness direction of the porous portion of the anode body, and
the wall surface of the main pit is declined relative to the length direction of the main pit with an angle of 0.01° or more and 3° or less.

2. The electrode foil for an electrolytic capacitor of claim 1, wherein the plurality of tunneled pits have an average diameter of 170 nm or more and 2100 nm or less.

3. The electrode foil for an electrolytic capacitor of claim 1, wherein a diameter of the main pit is smaller at the core part side than at the surface side of the porous portion.

4. The electrode foil for an electrolytic capacitor of claim 1, wherein the diameter of the main pit is larger at the core part side than the surface side of the porous portion.

5. The electrode foil for an electrolytic capacitor of claim 1, wherein the anode body has a first main surface and a second main surface opposite to the first main surface,
the porous portion has a first porous portion provided on the first main surface side and a second porous portion provided on the second main surface side,
the main pit has a first pit inside the first porous portion and a second pit inside the second porous portion, and
at least a portion of the first pit extends from the first porous portion to the second porous portion.

6. The electrode foil for an electrolytic capacitor of claim 5, wherein at least a portion of the first pit is continuous with at least a portion of the second pit.

7. The electrode foil for an electrolytic capacitor of claim 1, wherein at the cross section in the thickness direction of the porous portion of the anode body, the length direction of the main pit and the thickness direction of the porous portion forms an angle of 45° or less.

8. The electrode foil for an electrolytic capacitor of claim 1, wherein each of the plurality of tunneled pits includes a small pit having a length of 70% or less of the length of the main pit in a surface region of the porous portion.

9. The electrode foil for an electrolytic capacitor of claim 8, wherein at the cross section in the thickness direction of the porous portion of the anode body, a length direction of the small pit and the thickness direction of the porous portion forms an angle of more than 45° and 88° or less.

10. The electrode foil for an electrolytic capacitor of claim 1, wherein the pit includes a branched pit branching and extending from the main pit, and
at the cross section in the thickness direction of the porous portion of the anode body, a length direction of the main pit and a length direction of the branched pit forms an angle of 70° or more and 110° or less.

11. The electrode foil for an electrolytic capacitor of claim 1, wherein the interface layer contains the first element by 0.01 mass % or more relative to all elements.

12. The electrode foil for an electrolytic capacitor of claim 1, wherein the metal skeleton includes a first metal,
the first metal includes Al,
the dielectric layer includes an oxide of a second metal, and
the second metal includes at least one selected from the group consisting of Ta, Nb, Ti, Si, Zr, and Hf.

13. An electrolytic capacitor comprising a capacitor element, wherein the capacitor element includes the electrode foil for the electrolytic capacitor of claim 1,
a conductive polymer compound covering at least a portion of the dielectric layer.

14. The electrolytic capacitor of claim 13, comprising the capacitor element and a liquid component.

15. The electrolytic capacitor of claim 14, wherein the liquid component includes a polyol compound.

* * * * *